(No Model.)

J. C. WILKES.
PENCIL HOLDER.

No. 320,828. Patented June 23, 1885.

WITNESSES:
Fred. G. Dieterich
Maurice Delmar

Joseph C. Wilkes,
INVENTOR.
By Louis Bagger & Co.,
ATTORNEYS.

UNITED STATES PATENT OFFICE.

JOSEPH CURRINGTON WILKES, OF BUCHTEL, OHIO.

PENCIL-HOLDER.

SPECIFICATION forming part of Letters Patent No. 320,828, dated June 23, 1885.

Application filed February 24, 1885. (No model.)

*To all whom it may concern:*

Be it known that I, JOSEPH C. WILKES, a citizen of the United States, and a resident of Buchtel, in the county of Athens and State of Ohio, have invented certain new and useful Improvements in Pencil-Holders; and I do hereby declare that the following is a full, clear, and exact description of the invention, which will enable others skilled in the art to which it appertains to make and use the same, reference being had to the accompanying drawings, which form a part of this specification, and in which—

Figure 1:
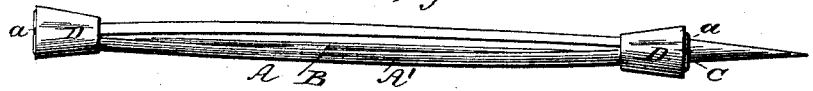
Figure 2:
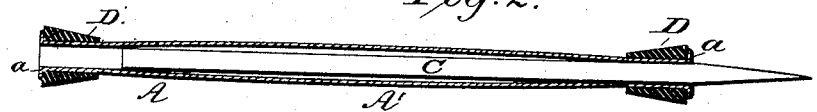
Figure 3:

Figure 1 is a side view of my improved pencil-holder. Fig. 2 is a longitudinal sectional view of the same, and Fig. 3 is an end view.

Similar letters of reference indicate corresponding parts in all the figures.

My invention has relation to slate-pencil holders; and it consists in the improved construction of a cheap, efficient, and noiseless holding device, which will be hereinafter more fully described and claimed.

In the accompanying drawings, A denotes a tube or casing, made of sheet metal or any other suitable material, and having a longitudinal slot, B, running from end to end. This tube or casing, which is open at both ends, has a swell, A', in the middle, from which it tapers gradually to both ends, as shown. The ends are turned up to form flanges $a$, as shown.

C denotes the slate-pencil, which is inserted into the tube, and held therein by being clamped by one or both of the tapering or reduced ends of the tube, as shown in Fig. 2. If the tube were cylindrical, or of the same dimensions from one end to the other, it would be apt to bind the pencil inserted into it too tight, so that this could not readily be removed, adjusted, or reinserted; but by making the tube with a swelled or bulging middle part, causing it to bind the pencil only at both ends, the latter may be readily adjusted and still be held firmly enough in the tube to prevent displacement in using the device. Placed upon opposite ends of the tube are the rubber sleeves D D, which are prevented from slipping off the tapering ends by the flanges $a$. These rubbers operate to contract the tapering slotted ends of the tube around the pencil, so as to firmly clamp the latter, and they also form cushions or bearings upon which the pencil will rest when it is placed upon a slate or table, thus making the entire device noiseless, and avoiding the unpleasant rattling sound caused by dropping the pencil on the slate. When the holder is carried in the pocket, these rubber sleeves will also prevent it from working out, and thus getting lost.

From the foregoing description it will be seen that this device is not only cheap and efficient, but very durable, and so simple in its construction that there is nothing to get out of order.

Having thus described my invention, I claim and desire to secure by Letters Patent of the United States—

A pencil-holder consisting of a tubular case of sheet metal or other suitable material, slotted longitudinally from end to end and having a swelled or bulging middle part and flanges at its opposite ends, said ends being provided with rubber sleeves held in place by the flanges, substantially as and for the purpose herein shown and specified.

In testimony that I claim the foregoing as my own I have hereunto affixed my signature in presence of two witnesses.

JOSEPH CURRINGTON WILKES.

Witnesses:
  NOE JOHNSTON,
  NEHEMIAH OHNEY WHITMORE.